Feb. 5, 1963   A. S. TAYLOR ET AL   3,076,365
MACHINE FOR SLITTING TISSUES
Filed April 7, 1958   3 Sheets-Sheet 1
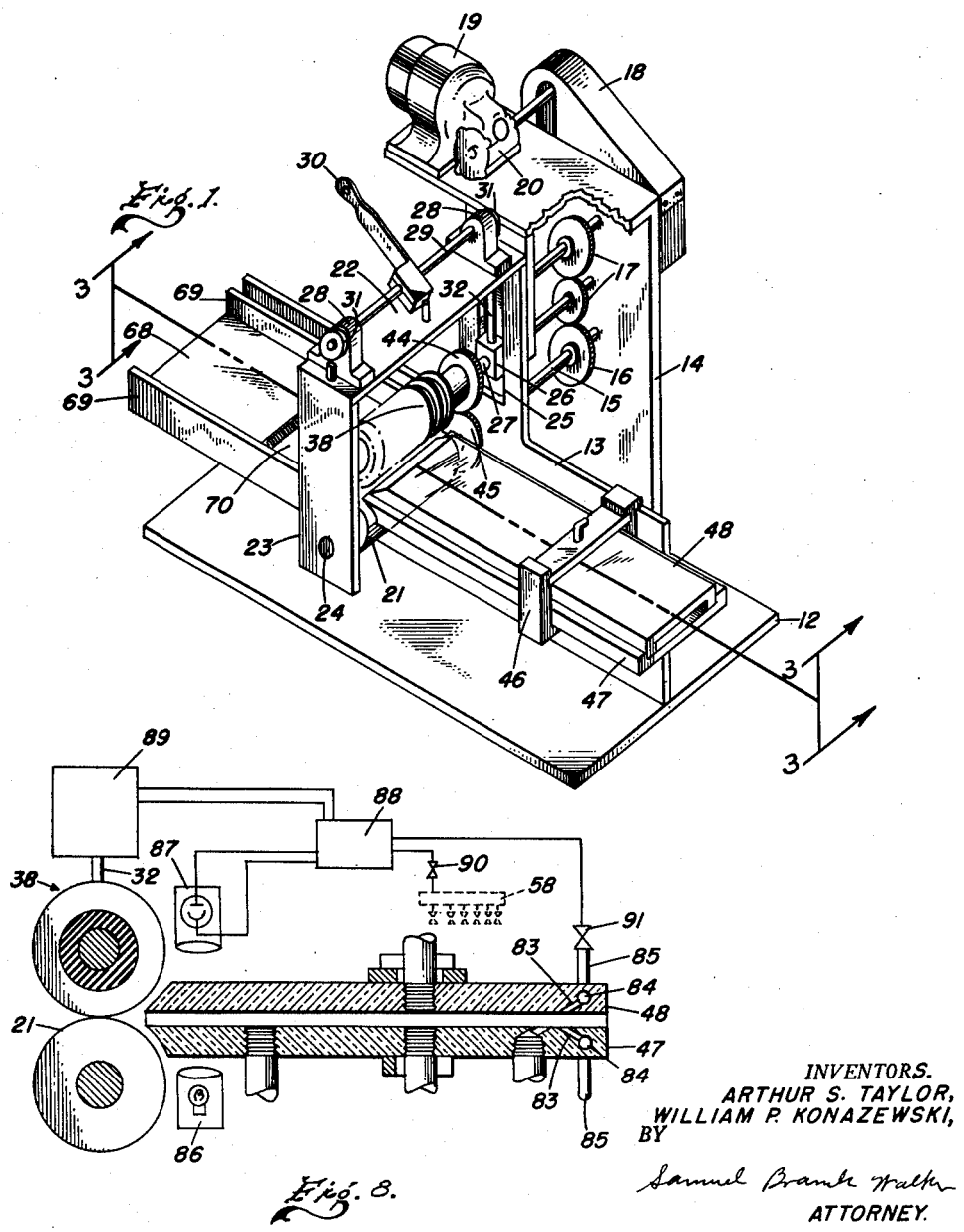
INVENTORS.
ARTHUR S. TAYLOR,
WILLIAM P. KONAZEWSKI,
BY
Samuel Branke Walker
ATTORNEY.

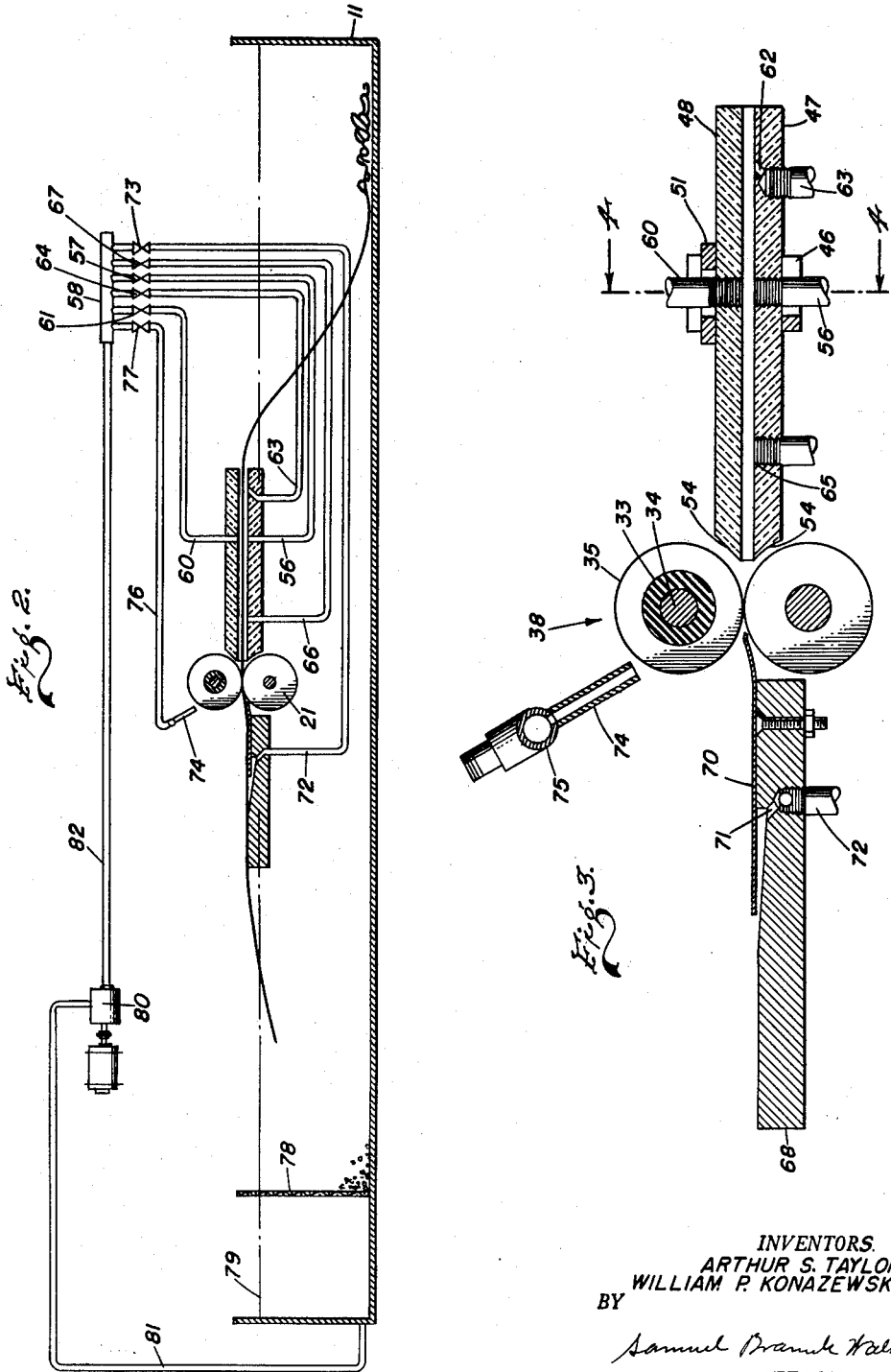

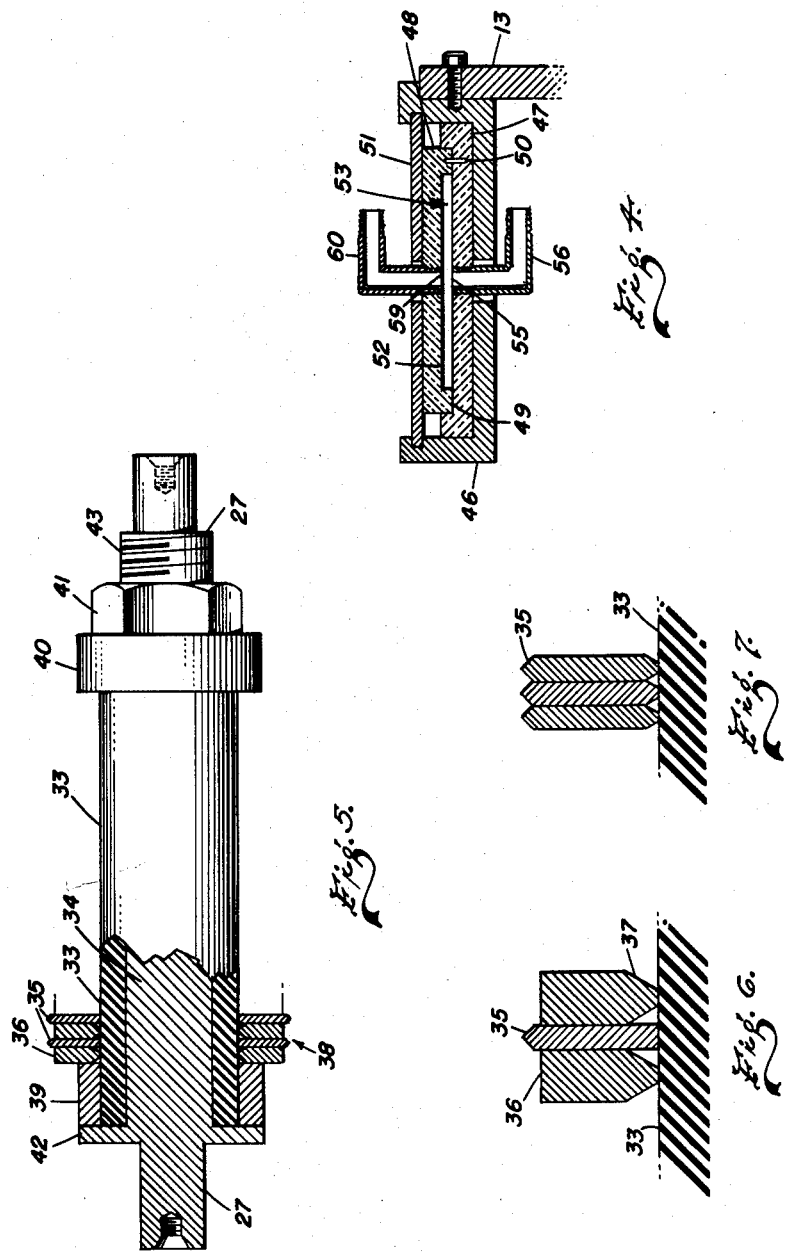

_United States Patent Office_

3,076,365
Patented Feb. 5, 1963

3,076,365
MACHINE FOR SLITTING TISSUES
Arthur S. Taylor, Spring Valley, and William P. Konazewski, Pearl River, N.Y., assignors to American Cyanamid Company, New York, N.Y., a corporation of Maine
Filed Apr. 7, 1958, Ser. No. 726,833
3 Claims. (Cl. 83—63)

This invention relates to a machine for slitting tissues, particularly membranes from the intestines of animals, for subsequent treatment and twisting to form surgical sutures, ligatures, or strings for musical instruments, or sports equipment.

This application is a continuation-in-part of application Serial No. 585,878 filed May 18, 1956, now Patent No. 2,850,763 dated September 9, 1958, Method of Slitting Tissues.

The tissues to be slit are conveniently from animals such as beef, calves, sheep or swine. Usually the strips are from the intestinal tract of animals and may be either the inner or the outer layer, or both layers, of any portion of animal intestines. Conveniently the outer layer of part of a beef gut is used. The small intestine is frequently spoken of as beef rounds, and the outer layer or serosa tissue layer from the beef round may be used. The beef serosa may be from about 100 feet for bulls and steers, to about 135 feet long for cows. Usually the first 60 to 80 feet or so has fewer blemishes and therefore is the preferred portion. The whole serosa tissue, which may be up to nearly 3 inches wide, or narrow portions, may be selected and slit. Similarly selected portions of tissues from other animals such as the submucosal layer of the sheep intestines may be used.

The U.S. Pharmacopoeia XV requires that the surgical sutures be a strand prepared from collagen derived from healthy mammals.

For purposes of convenience the starting material is referred to as tissues. The tissues are slit into ribbons or plies which are hereafter termed plies. The plies are from about 1 to 2 millimeters in width up to the full width that can be secured from the tissues being slit.

For surgical sutures, particularly for fine work such as eye surgery, it is desirable that the plies be narrow. Plies as narrow as 1 or 2 millimeters may be twisted together to form sutures as small as 6/0. Wider plies or a larger number of plies may be twisted together to form larger strings for larger sutures or for strings used in musical instruments or game rackets. For example tennis, or badminton or squash rackets are preferably strung with a comparatively large diameter gut string.

The plies when twisted together are usually referred to as strings, and may be polished, or sized and chromed, or otherwise treated. At times a single ply may be twisted to form a string for a small size suture. Sutures are usually more uniform in diameter and strength, and stronger if twisted from more than one ply. In the past the limitations of slitting have necessarily required that the plies be wider than might otherwise be desired. With previous machines it has been difficult or impossible to slit plies which are as narrow as would be desired.

In the past tissues, which when wet are tough and very slippery and difficult to handle, have been slit over stationary knives on slitting pegs such as described in the U.S. patent to Valentine et al., 2,720,678, "Apparatus for Separating the Membranes of Animals Intestines."

The friction in the cutting knives and the variation in tension in the plies induced variations in width and gave uneven characteristics and ragged edges to the plies. Attempts have been made to use mechanical slitting knives in rotating systems with a grooved tissue supporting roller but the feeding of the tissues to the slitting mechanism presented unsolved problems.

It has now been found that the tissue may be slit into plies of practically the full length of the starting tissue and of a comparatively full width, or any narrower desired width down to less than 2 millimeters, by using a novel hydraulic orientation system, and a novel cutting system in cooperation. Conveniently plies of 4 to 6 millimeter width are preferred, as these are narrow enough for most suture sizes, and are strong enough to be handled. The tissue may be chromed before slitting if desired. Chrome treatment toughens the tissue so narrower plies may be slit and handled.

The orientation system provides a restricted feed throat in which hydraulic jets, operating on the tissue, spread the tissue uniformly both longitudinally and laterally, and provide a hydraulic feed system which gives great uniformity of feed.

The slitting system itself consists of a plurality of parallel flexibly mounted disc knives working against a smooth surface roller which uniformly slits the tissue.

In order that the invention may be more readily understood, a particular modification of our method, and apparatus for cutting tissue, is illustrated in the accompanying drawings and the following description.

In the drawings:

FIGURE 1 shows a pictorial view partly broken away of the slitting and feeding mechanism.

FIGURE 2 is a side view partly in section of the slitting and feeding mechanism together with its associated hydraulic feed lines and storage tanks.

FIGURE 3 is a longitudinal sectional view of the slitting and feeding mechanism on an enlarged scale along plane 3—3 of FIGURE 1.

FIGURE 4 is a view along line 4—4 of FIGURE 3 showing a cross section of the orientation plates.

FIGURE 5 is a detailed view partly broken away of the cutting roll assembly.

FIGURE 6 is a partial sectional view of one modification of the cutting roll on an enlarged scale.

FIGURE 7 is a partial sectional view on an enlarged scale of another modification of the cutting roll for narrow strips.

FIGURE 8 is an enlarged sectional view of an automatic feeding modification for large scale operation in a location similar to FIGURE 3.

For purposes of convenience the present slitter will be described for use in slitting beef serosa tissue from beef rounds into plies of about 4 millimeter width for small sutures. Obviously, by modifying the size of the machine, particularly the feed throat, and the slitting blade spacing, any desired width plies can be slit from any collagenous tissue suitable for sutures or strings.

The slitting operation is conducted wet, that is, the tissue is stored under water, which may have a salt dissolved therein, and the spreading and slitting operations are conducted in a flood of water although conveniently the spreading and slitting mechanisms are above the surface of the water in the operating tank.

_Slitter_

The tissues are in a tank 11 as shown in FIGURE 2. In the tank is a base plate 12, which may be part of the floor of the tank but is conveniently separate. Extending vertically from the base plate is a main frame 13. In the back of the main frame is a second vertical frame called the back frame 14. Journaled in these two frames and extending forwardly therefrom is a tissue support roll shaft 15. The tissue support roll shaft has thereon a drive gear 16 which gear is driven by a drive train 17 which in turn is driven by a chain drive 18. The variable speed motor 19 drives the chain through a variable reduction drive 20. The variable speed motor and variable drive are such that any desired surface speed of the tissue support roll may be obtained.

Mounted on the tissue support roll shaft 15 is a tissue support roll 21. The tissue support roll is preferably of a hard material such as steel. This roll as well as the metal parts of the rest of the machine are conveniently of stainless steel or other non-rusting material.

The surface of the tissue support roll is smooth without grooves. At the top of the main frame is an upper cross frame 22. Extending downwardly from the upper cross frame 22 is an outboard frame 23. The end of the tissue support roll shaft 15 is journaled in the outboard frame 23 by an outboard frame bearing 24. In the inner side of both the main frame and the outboard frame is a bearing block slot 25. In the bearing block slots are bearing blocks 26 in which is journaled a mandrel shaft 27. On top of the upper cross frame are two eccentric shaft bearings 28 in which is journaled an eccentric shaft 29. The eccentric shaft has thereon an eccentric shaft handle 30. Mounted at the ends of the eccentric shaft are hold down washers 31 which bear on the hold down pins 32. The hold down pins rest on the bearing blocks 26 and force them downward when the handle is moved forward thereby controlling the downward pressure on the mandrel shaft 27, and the cutting pressure on the tissue.

As shown in FIGURE 5 a resilient sleeve 33 surrounds the mandrel 34 which may be an integral part of the mandrel shaft as shown in FIGURE 5, or built-up thereon. The resilient sleeve is of a resilient material such as rubber or neoprene. Polyurethane of about 90 durometer makes a particularly long lived resilient sleeve. The polyurethanes are being increasingly used instead of rubber where long lived resilience is required. The resilient sleeve is preferably vulcanized to the mandrel although it may be merely slipped thereon. The resilient material is preferably ground to size and concentricity. Mounted on the resilient sleeve are a plurality of circular knives 35. These knives should be of uniform size and shape. The cutting edge conveniently has an included angle of about 90°. A sharper knife with a cutting edge of 45° or less may be used, but an angle of greater than 45° gives a better reinforcement for the cutting edge and gives longer life. Single beveled edge knives may also be used. Between the knives may be assembled a group of spacers 36. The spacers 36 are of such thickness that when added to the thickness of the knives the cutting edges of the knives are spaced apart a distance equal to the desired width of cut. For narrow plies the knives may be mounted adjacent to each other as shown in FIGURE 7. Preferably, either the circular knives or the spacers have a recess 37 so that the resilient material may flow thereinto when the knives are radially displaced.

Each knife is thus resiliently positioned so that when the slitter roll 38 formed by the knives on the mandrel is pressed against the tissue support roll 21 any irregularities in either the knives or the tissue support roll is compensated by the resilience of the mounting of the cutting knives and cutting contact is maintained between each knife and the tissue support roll at all times. The knives and spacers are positioned on the resilient sleeve by a ring 39 at one end and a retaining ring 40 and retaining nut 41 at the other end. One end of the mandrel has a flange 42 thereon and the other end has threads 43 thereon. By having disc circular knives mounted on the resilient sleeve it is possible to have the knives spaced very close together—less than 2 millimeters—and there are no crevasses in the working parts in which fragments of tissue may lodge. Further the slitter roll may be conveniently and quickly disassembled for cleaning or for changes of spacers to give different width of plies. The spacing between the knives is conveniently, but not necessarily, uniform. At times it is desirable that the outer knives have a slightly wider spacing so that tissues which taper towards the edges may be slit into plies of uniform cross-section. The plies from near the edges of the tissue may be thinner, so a wider ply is required to make a desired size of string. The spacers may also be of a resilient material, and if resilient may be of such diameter as to partially bear against the tissues being slit, so as to give additional traction to the rolls.

The pressure between the slitter roll and tissue support roll is controlled by moving the position of the eccentric shaft handle which changes the pressure on the hold down pins 32 which forces the two rolls together.

Also mounted on the mandrel shaft is a slitter roll driving gear 44 which is driven by a support roll gear 45.

Tissue Feed

Adjacent to the bite of the rolls is a tissue feed system. An orientation plate support bracket 46 is attached to the main frame and supports a bottom orientation plate 47 and a cover orientation plate 48. The orientation plates are conveniently of a transparent plastic such as methyl methacrylate, so that the motion of the tissue between them may be observed. The bottom orientation plate has a slot 49 therein, as shown in FIGURE 4, in which the cover orientation plate fits. The cover orientation plate is positioned by the edges of the slot and positioning pin 50 and held in place by a lock plate 51, which rotates into grooves in the support bracket 46. Other retaining means may be used.

In the cover orientation plate 48 is a tissue feed slot 52. The tissue feed slot in the cover orientation plate and the bottom orientation plate together form a tissue feed throat 53 through which the tissues to be slit are fed. The width of the tissue feed slot is slightly greater than that of the tissue being slit. Inasmuch as tissue width varies both within a species, and between species, several widths of tissue feed slots in different cover plates may be used for greater versatility.

Both the bottom orientation plate and the cover orientation plate have beveled ends 54 to permit the front end of these plates to extend nearly into the bite of the rolls that is the convergency of the two rolls towards their line of tangency on the feed side. The bottom orientation plate has a central liquid orifice 55 to which leads a bottom spreading feed line 56. This may be a pipe which is threaded into the bottom orientation plate together with a flexible tube to control valve 57 in a liquid supply manifold 58. The cover orientation plate 48 has an upper central liquid orifice 59 to which is attached an upper spreading liquid feed line 60 which in turn is attached to a control valve 61 in the manifold 58. The central liquid orifices are spaced opposite each other and spread the tissue by the flowing of liquid through them. When beef serosa tissue or other tissue is placed between the two plates, and liquid is supplied through the two central liquid orifices, the two jets of liquid oppose, and liquid flows outwardly, so that the tissue is spread out gently but firmly. By Bernoulli's theorem the pressure is lowest nearest the orifice, and hence the tissue is centered and stabilized.

Additional supply lines for liquid may be used as shown in FIGURES 2 and 3. A brake orifice 62 is formed in the bottom orientation plate by cutting a rearwardly-extending orifice into the throat face of the plate connected to a brake orifice feed line 63, running to a brake orifice control valve 64 which in turn is attached to the manifold 58.

A front spreading orifice 65 may be used in the bottom orientation plate 47 near the roll end. The front spreading orifice has attached thereto a front spreading orifice feed line 66 running to a front spreading orifice control valve 67. A liquid flow through the front spreading orifice may be used in conjunction with the flow through upper and lower central liquid orifices to control the spreading of the tissue as it passes through the tissue feed throat. The front spreading orifice may be given an inclination in a forward direction if it is desired to give additional impetus to the tissue as it is fed through the slitter roll.

After the tissue passes the slitter roll, it passes to a discharge trough 68. The discharge trough may be formed of a flat sheet of material with trough sides 69. Attached to the upper face of the discharge trough is a removal jet plate 70 which is a thin sheet of metal extending nearly into the discharge bite of the rolls and which may be either adjacent to or rest on the support roll. Under the removal jet plate is a removal jet 71 which is supplied by a removal jet feed line 72, the flow of liquid to which is controlled by a removal jet control valve 73. The removal jet plate and the removal jet are so positioned that liquid supplied through the feed line to the jet flows away from the cutting rolls, and as tissue is discharged from the cutting rolls it is picked up by the moving liquid and drawn away from the slitting mechanism. The removal jet plate prevents the plies from adhering to the tissue support roll. The discharge jet aids in removing the plies uniformly, and in insuring uniform tissue feed.

Adjacent to the slitter roll 38 is a cleaning spray jet 74, which consists of a comb of a plurality of jets attached to a spray jet manifold 75 which in turn is supplied by a spray jet feed line 76, the flow of which is controlled by a spray jet control valve 77. One jet cleans between each pair of cutting knives.

The cleaning spray jet is used to wash debris from the slitter roll. It also prevents plies, particularly defective plies, from wrapping around the slitter roll and jamming it.

As shown in FIGURE 2 at a discharge end of the tank 11 is a strainer 78 to keep debris from flowing into the pump sump 79. A pump 80 draws liquid from the pump sump through a pump feed line 81 and discharges the liquid through the pressure line 82, which supplies liquid to the liquid supply manifold 58. Obviously, the details of the piping system may be varied to conform to space requirements of the site of installation.

*Operation*

In operation the end of the tissue is placed over the front of the cover orientation plate, which is removed for this operation, and the cover orientation plate placed in position in the bottom orientation plate and the lock plate closed to retain the plate in position. The eccentric shaft handle is moved to release pressure on the slitter roll. Liquid is supplied to both the central liquid orifice and the upper central liquid orifice, the flow being controlled by the respective control valves. The flowing liquid spreads the tissue out flat and causes it to move forward towards the bite of the roll. The motor driving the rolls is turned on, and as the rolls rotate the end of the tissue is drawn through them. After the end of the tissue has passed between the rolls, in a spread condition, the eccentric shaft handle is moved to apply pressure and the slitter roll forced against the tissue support roll. The edge plies may be of inadequate width or discontinuous. The central plies, of proper configuration may be left connected to the unslit end of the tissue for ease in handling, and as the rolls rotate the selected plies are permitted to flow smoothly down the discharge trough and then removed in due course for further treatment. The plies may be separated from the unslit end of the tissue at any convenient time. As the tissue is drawn forward by the slitter roll and the tissue support roll, the tissue is slit as it is uniformly fed and spread out by the liquid supplied from the central liquid orifice and the upper central liquid orifice. The rate of liquid supplied to these orifices is controlled for best spreading. A water pressure of from 30 to 40 lbs. per square inch with a quarter horsepower centrifugal pump works very well. The liquid supply to the brake orifice may be controlled to slow down the feed of the tissue and the front spreading orifice may be used to assist in spreading or to speed up the supply of tissue to the slitter roll as required, particularly during the initial threading operation. Usually this orifice is not needed and the central liquid orifice and the upper central liquid orifice supply sufficient liquid flow for proper feeding of the tissue to the slitter roll, once slitting is started.

The cleaning spray jet is used to keep partial plies or other debris from accumulating on the slitter roll. Inasmuch as the width of the tissue varies, certain plies at the edges of the split tissue are defective and discontinuous. These plies may be permitted to accumulate in the tank and are drawn by the flow of liquid down against the strainer 78 from which they are removed from time to time.

As shown the bite of the rolls is conveniently slightly above the liquid of the tank, and the supply of liquids to the various orifices controls the feeding of the tissue. The tank may be filled above the level of the rolls and the entire operation conducted submerged. The tank liquid may be water, or saline water; other liquid can be used, but water is most economical.

Any tissue of any length suitable for the formation of plies may be slit rapidly.

Tissues may be slit at speeds of from less than 10 feet per minute to over 150 feet per minute. A higher liquid pressure is required at the higher slitting speeds. Orifices of ¼ inch diameter are convenient for full width beef serosa. ⅛ inch jets may be used for narrower tissues.

For more rapid feeding and handling operations, auxiliary jets may be used to control the threading or feeding of the tissues. These jets may direct the tissue into the tissue feed throat, and into the bite of the rolls. One such alternative auxiliary feed system is shown in FIGURE 8. A threading jet slot 83 is cut into each of the orientation plates, to which liquid is supplied from a threading jet chest 84, supplied in turn by a threading liquid line 85. During the threading of tissue, liquid is supplied under pressure, through these threading jet slots, and by the Venturi action, liquid, and the end of the tissue, is drawn through the tissue feed throat, and fed to the slitter roll.

For large scale operations, a light source 86 may be placed beneath the transparent orientation plates, which shines on a photocell 87. The light beam is interrupted when a tissue is passing through the throat. A timer 88 is activated from the photocell, and controls a hold-down solenoid 89, and a spreading control valve 90 and a threading control valve 91. The timer is so set that the spreading control valve is closed, and the threading control valve is open, and the hold-down solenoid releases pressure on the slitter roll, in normal position. When a tissue in passing through the throat shuts off light, the timer, after a short delay to permit the end of the tissue to just pass the bite of the rolls, closes the threading control valve, shutting off the threading liquid supply, and opens the spreading control valve. This spreads the tissue fully, and a short time later, when the full spread tissue is being supplied to the slitter roll, the solenoid is actuated applying pressure to the slitter roll, and starting the uniform slitting of the tissue into plies. When the end of the tissue passes the photocell, the timer, after a short delay to permit the end of the tissue to be slit, releases the hold-down solenoid, opens the threading control valve, and closes the spreading control valve, resetting for the next tissue to be fed.

Other minor modifications may be made, and mechanical equivalents substituted throughout without de-

We claim:

1. A hydraulic feed for a tissue slitter comprising: a bottom orientation plate at least part of which is transparent, a cover orientation plate at least part of which is transparent, means to support said plates slightly separated from and parallel to each other, thus forming a tissue feed throat, opposed liquid orifices passing perpendicularly through each of said plates, means to supply a liquid under pressure to each of said orifices, an additional separate tissue spreading orifice in at least one of said plates, a threading orifice in at least one of said plates directed in the direction of tissue traveling through the tissue feed throat adjacent the entrance to the throat, a braking orifice directed opposed to the direction of tissue travel to regulate the tissue feed speed, means to control liquid supply to said threading orifice, and alternatively to said opposed orifices, said spreading orifice, and said braking orifice, slitter means located adjacent the exit of the tissue feed throat, and means to pass a beam of light through said transparent parts of the orientation plates, a photocell to detect interruption of said light beam, and control means, including time delay means, activated by said photocell, and governing said means to control liquid supply, whereby the photocell senses the presence of tissue in the tissue feed throat and activates the control means, which after a time delay to permit the front end of the tissue to pass the slitter means, supplies liquid under pressure to the spreading orifice, the opposed liquid orifice and braking orifice for spreading and feeding the tissue and stops the supply of liquid to said threading orifices, said control means, on the advance of the trailing end of the tissue past the photocell, being activated after a time delay to permit the trailing end of the tissue to pass the slitter means, stops the flow of liquid under pressure to the spreading orifices, the opposed liquid orifice and braking orifice and initiates the liquid supply to said threading orifice.

2. A hydraulic feed comprising: a bottom orientation plate at least part of which is transparent, a cover orientation plate at last part of which is transparent, means to support said plates slightly separated from and parallel to each other, thus forming a feed throat, opposed liquid orifices passing perpendicularly through each of said plates, means to supply a liquid under pressure to each of said orifices, a threading orifice in at least one of said plates directed in the direction of travel through the feed throat adjacent the entrance to the throat, a braking orifice directed opposed to the direction of travel, to regulate material feed speed means to control liquid supply to said threading orifice and alternatively to said opposed orifices and said braking orifice, and photoelectric control means comprising a light source positioned to pass a light beam through a transparent part of said plates and a photocell which senses interruption of said light beam and hence the presence of material in the feed throat and operates said means to control the liquid supply including time delay means to feed liquid under pressure to the threading orifice when the throat is empty, and to the braking orifice when material is present, with a time delay to permit ends of the material to pass completely through the feed throat before switching liquid feeds.

3. Apparatus for slitting tissue comprising: a smooth tissue support roll; and mounted parallel to said tissue support roll, a slitter roll comprising a mandrel, a resilient sleeve on the mandrel, a plurality of circular knives individually mounted on said sleeve, with the cutting edges of the knives in contact with said tissue support roll; and a tissue feed throat comprising two parallel plates at least part of each of which is transparent having flat surfaces slightly separated from each other and parallel to the axes of said rolls, with one pair of edges of said surfaces adjacent to and discharging a fed tissue towards the line of tangency, on the entrance side of said tissue support roll and said slitter roll, said flat surfaces having opposed liquid orifices therethrough, threading orifices in each of said plates, directed in the direction of tissue travel, all orifices being on a centerline of such surface which is perpendicular to the axes of the rolls, means to supply a liquid to each of said orifices and including time delay means, slitter controlling means operating the separation of the slitter and support rolls to permit the easier initial passage of tissue therebetween and photoelectric control means comprising a light source and a photocell aligned with said transparent parts of said plates which senses the presence of tissue in the feed throat and operates in timed sequence by way of the time delay means said liquid supply means to supply liquid to said opposed orifices, and also said slitter controlling means to close said slitter roll and support roll into cooperation with one another after the tissue has been fed therebetween; said liquid supply and slitter control means operating, in the absence of tissue in the feed throat, to stop the liquid supply to the opposed orifices and separate the slitter and tissue rolls, and initiate the liquid supply to said threading orifices.

References Cited in the file of this patent

UNITED STATES PATENTS

| | | |
|---|---|---|
| 135,266 | Crocker | Jan. 28, 1873 |
| 519,685 | Reyels et al. | May 8, 1894 |
| 1,185,790 | Greising et al. | June 6, 1916 |
| 1,319,219 | Hickey | Oct. 21, 1919 |
| 1,907,413 | Anderson et al. | May 2, 1933 |
| 1,968,242 | Birch | July 31, 1934 |
| 2,037,806 | Little | Apr. 21, 1936 |
| 2,176,307 | Lamb et al. | Oct. 17, 1939 |
| 2,607,380 | Ritzpatrick | Aug. 19, 1952 |
| 2,637,395 | Muller | May 5, 1953 |
| 2,775,296 | Tuck | Dec. 25, 1956 |
| 2,785,928 | Hanson | Mar. 19, 1957 |
| 2,805,898 | Willis | Sept. 10, 1957 |
| 2,831,209 | Bergman et al. | Apr. 22, 1958 |
| 2,848,820 | Wallin et al. | Aug. 26, 1958 |
| 2,920,520 | Duba | Jan. 12, 1960 |
| 2,968,982 | Cousino | Jan. 24, 1961 |